United States Patent
Tillotson

(10) Patent No.: US 9,942,787 B1
(45) Date of Patent: Apr. 10, 2018

(54) VIRTUAL PRIVATE NETWORK CONNECTION QUALITY ANALYSIS

(71) Applicant: Amazon Technologies, Inc., Seattle, WA (US)

(72) Inventor: Paul John Tillotson, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 15/077,634

(22) Filed: Mar. 22, 2016

(51) Int. Cl.
H04W 24/08 (2009.01)
H04L 12/46 (2006.01)
H04W 72/08 (2009.01)

(52) U.S. Cl.
CPC ......... *H04W 24/08* (2013.01); *H04L 12/4641* (2013.01); *H04W 72/085* (2013.01)

(58) Field of Classification Search
None
See application file for complete search history.

(56) References Cited

U.S. PATENT DOCUMENTS

| | | |
|---|---|---|
| 7,072,346 B2 | 7/2006 | Hama |
| 7,633,961 B2 | 12/2009 | Raut et al. |
| 7,903,553 B2 | 3/2011 | Liu |
| 7,965,642 B2 | 6/2011 | Shand et al. |
| 8,082,581 B2 | 12/2011 | Wu |
| 8,209,749 B2 | 6/2012 | Babula et al. |
| 8,261,341 B2 | 9/2012 | Stirbu |
| 8,443,435 B1 | 5/2013 | Schroeder |
| 8,543,734 B2 | 9/2013 | McDysan |
| 8,559,441 B2 | 10/2013 | Miyabe |
| 8,559,449 B2 | 10/2013 | Rao et al. |
| 8,612,599 B2 | 12/2013 | Tung et al. |
| 8,656,420 B2 | 2/2014 | Foster et al. |
| 8,705,394 B2 | 4/2014 | Venkatachalapathy et al. |
| 8,724,642 B2 | 5/2014 | Miller et al. |
| 2003/0191841 A1 | 10/2003 | DeFerranti et al. |
| 2007/0211730 A1 | 9/2007 | Cuthbert et al. |
| 2009/0077245 A1 | 3/2009 | Smelyansky et al. |
| 2010/0122175 A1 | 5/2010 | Klein |
| 2010/0162036 A1 | 6/2010 | Linden et al. |
| 2010/0275262 A1 | 10/2010 | Anand et al. |
| 2011/0093849 A1 | 4/2011 | Chawla et al. |
| 2011/0126059 A1 | 5/2011 | Klein |
| 2011/0145836 A1 | 6/2011 | Wheeler et al. |

(Continued)

OTHER PUBLICATIONS

Stever Morad, "Amazon Virtual Private Cloud Connectivity Options", Amazon Web Services, Jul. 2014, pp. 1-31.

(Continued)

*Primary Examiner* — Yaotang Wang
(74) *Attorney, Agent, or Firm* — Robert C. Kowert; Meyertons, Hood, Kivlin, Kowert & Goetzel, P.C.

(57) ABSTRACT

A first network packet directed from one VPN endpoint to a second VPN endpoint is received at an intermediary network processing component. Metadata indicating that the first network packet is a candidate for monitoring is stored. In response to determining that a second packet received at the intermediary comprises an acknowledgement to the first packet, a traffic quality metric is stored at a location accessible to a VPN traffic analyzer. The VPN traffic analyzer responses to a traffic quality query using the metrics collected at the intermediary.

20 Claims, 10 Drawing Sheets

(56) References Cited

U.S. PATENT DOCUMENTS

| | | |
|---|---|---|
| 2012/0011363 A1 | 1/2012 | Kim et al. |
| 2012/0278599 A1 | 11/2012 | Nilakantan et al. |
| 2013/0031424 A1 | 1/2013 | Srivastava et al. |
| 2013/0227355 A1 | 8/2013 | Dake et al. |
| 2013/0238461 A1 | 9/2013 | Tieken et al. |
| 2014/0075048 A1 | 3/2014 | Yuksel et al. |
| 2014/0294018 A1* | 10/2014 | Sung .................. H04L 63/0272 370/474 |
| 2015/0222545 A1 | 8/2015 | Sarkar et al. |
| 2015/0263946 A1 | 9/2015 | Tubaltsev et al. |
| 2015/0271011 A1 | 9/2015 | Neginhal et al. |
| 2015/0271102 A1 | 9/2015 | Antich |

OTHER PUBLICATIONS

"Amazon Virtual Private Cloud: User Guide", Amazon Web Services, Copyright 2016, pp. 1-216.

U.S. Appl. No. 14/192,476, filed Feb. 27, 2014, Shuai Ye.

AWS Documentation, "Accept a Hosted Connection", Oct. 22, 2013, 1 Page.

AWS Documentation, "Adding a Hardware Virtual Private Gateway to Your VPC", Oct. 15, 2013, pp. 1-64.

Amazon Web Services, "AWS Direct Connect: User Guide", API Version, Oct. 22, 2013, pp. 1-42.

Amazon Web Services, "Amazon Virtual Private Cloud: User Guide", API Version, Oct. 1, 2013, pp. 1-147.

AWS Documentation, "Welcome", Oct. 22, 2013, pp. 1-2.

U.S. Appl. No. 14/274,546, filed May 9, 2014, Upendra Bhalchandra Shevade.

Sheila Frankel, et al., "Guide to IPsec VPNs: Recommendations of the National Institute of Standards and Technology", NIST, Dec. 2005, pp. 1-126.

U.S. Appl. No. 14/274,477, filed May 9, 2014, Upendra Bhalchandra Shevade.

U.S. Appl. No. 14/274,534, filed May 9, 2014, Upendra Bhalchandra Shevade.

U.S. Appl. No. 14/625,539, filed Feb. 2, 2015, Po-Chun Chen.

Amazon Web Services, "Amazon Virtual Private Cloud Network Administrator Guide" API Version, Oct. 1, 2014, pp. 1-125.

Amazon Web Services, "Amazon Virtual Private Cloud VPC Peering Guide", API Version, Oct. 1, 2014; pp. 1-22.

Amazon Web Services, "Amazon Virtual Private Cloud User Guide", API Version, Oct. 1, 2014, pp. 1-165.

* cited by examiner

VPN-<VPNID> traffic report 802

Inbound traffic 805 (towards <IVN-ID> from customer network outside provider network PN1)

| Packet category | Time interval start | Monitored packet count | Latency outside PN1 | Latency within PN1 | Packet loss rate (%) |
|---|---|---|---|---|---|
| Category Cat1 | 09:00:00 GMT | | | | |
| | 09:01:00 GMT | | | | |
| | 09:02:00 GMT | | | | |
| Category Cat2 | 09:00:00 GMT | | | | |
| | 09:01:00 GMT | | | | |
| | 09:02:00 GMT | | | | |
| ... | | | | | |

Table 805

Outbound traffic (from <IVN-ID> to customer network)

| Packet category | Time interval start | Monitored packet count | Latency outside PN1 | Latency within PN1 | Packet loss rate (%) |
|---|---|---|---|---|---|
| Category Cat1 | 09:00:00 GMT | | | | |
| | 09:01:00 GMT | | | | |
| | 09:02:00 GMT | | | | |
| Category Cat2 | 09:00:00 GMT | | | | |
| | 09:01:00 GMT | | | | |
| | 09:02:00 GMT | | | | |
| ... | | | | | |

Table 810

*FIG. 8*

VIRTUAL PRIVATE NETWORK CONNECTION QUALITY ANALYSIS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

In some data centers that have been set up to provide virtualized computing and/or storage facilities to external customers, a set of resources may be allocated for exclusive use by a given customer for designated periods of time. In one scenario, a virtual isolated network comprising numerous guest virtual machines and/or other devices may be set up for a customer at a provider network, and the customer may be granted substantial networking configuration flexibility for the isolated virtual network. For example, the customer may assign IP (Internet Protocol) addresses of choice with the isolated virtual network, set up subnets and routes, and so on, in a manner very similar to the way that network configuration settings could be selected at a customer-owned facility. A number of options may be supported for secure connectivity between the guest virtual machines of the isolated virtual network and the customer's resources outside the provider network, including for example the establishment of virtual private network (VPN) connections. Generally speaking, traffic associated with such VPNs may traverse network links inside as well as outside the provider network. As a result, isolating the sources of customer performance problems with respect to VPN traffic may be a non-trivial exercise, especially in large provider networks where thousands of endpoints may be utilizing VPN connections concurrently.

BRIEF DESCRIPTION OF DRAWINGS

FIG. 8 illustrates examples of VPN traffic metrics which may be provided to a client of a provider network, according to at least some embodiments.

Figure 1:
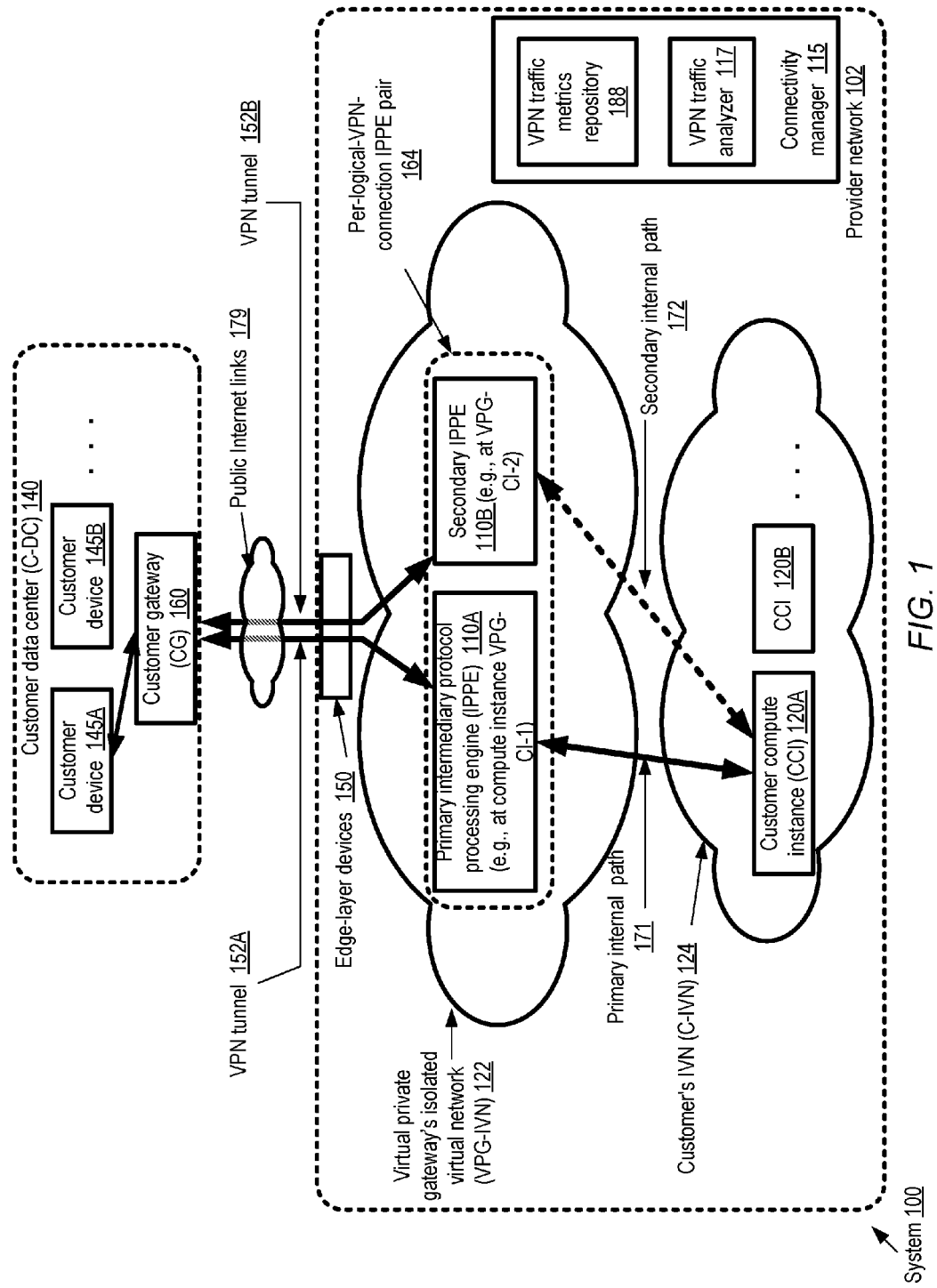
FIG. 1 illustrates an example system environment in which intermediary devices set up to establish secure connectivity between a customer data center and a customer's isolated virtual network (IVN) at a provider network may obtain performance metrics associated with virtual private network (VPN) connections, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating network traffic metrics at intermediary devices set up for virtual private network (VPN) connections between provider network devices and external devices are described. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. Resources of some of the services may be used for supporting other services: for example, as described in detail below, gateways that enable secure VPN connectivity between a customer's external data centers and provider network resources allocated to the customer may be established using compute instances (guest virtual machines) of a virtual computing service. The compute instances of the gateway may, for example, be hosted on commodity hosts, and the resulting gateways may thus be much less expensive to implement than gateways that rely on special-purpose proprietary networking devices. Gateways built using compute instances may represent one example of intermediary devices at which VPN traffic metrics may be measured or inferred, for example by matching packets flowing in one direction with corresponding acknowledgement packets flowing in the other direction and collecting metadata associated with such matched packets. In contrast to some network performance analysis techniques, the matching-based approach outlined herein may not introduce additional traffic (e.g., heartbeats or other messages) into the network, and may rely instead on analyzing client-submitted traffic which would have been transmitted regardless of whether quality metrics were being gathered or not. As a result of avoiding overhead packets associated with introduced packets, the view of network traffic conditions obtained using the proposed technique may correspond more closely to the conditions actually experienced by clients. The VPN traffic metrics may be provided to clients of the provider network and/or to administrators or diagnostic tools within the provider network, e.g., to help diagnose and resolve perceived and actual performance problems, to help with proactive resource deployment decisions, and so on. Metrics from several different VPN connections may be aggregated to help improve the performance of the VPN connectivity service as a whole in some embodiments.

At a virtualized computing service of the provider network, a single computing device may be used to instantiate multiple virtual machines, which may be referred to as "compute instances" (or simply "instances") herein, with the computing device being referred to as an "instance host" or a "virtualization host". Compute instances may also be referred to as "guest" virtual machines, e.g., as distinguished from administrative or privileged virtual machines which may form part of the virtualization management software. The virtual machines may serve as execution platforms for a variety of applications and service components, including, for example, intermediary protocol processing engines (IPPEs) used to implement virtual private gateways and collect VPN traffic metrics as described below. An instance host may be utilized in either a single-tenant mode or a multi-tenant node in different embodiments. In single-tenant mode, for example, a compute instance may be launched at the instance host on behalf of only a single customer, and as a result the resources of the instance host (e.g., processors, memory, storage and the like) may not be shared with other customers. In multi-tenant mode, compute instances may be launched on behalf of several customers at the same instance host, without the customers necessarily being informed that the same host that is being used for their workload is also being used for other customers. Such transparent resource sharing may enable more effective use of the hardware resources of the provider network (e.g., typically, a higher average utilization level may be achieved in multi-tenant mode than in single-tenant mode). IPPEs used for virtual private gateways may be implemented at instance hosts using either single-tenant mode or multi-tenant mode in different embodiments. As the likelihood of security breaches may be considered somewhat lower when only a single customer's traffic is flowing through an instance host than when multiple customer workloads are handled at a given instance host, single-tenant mode may be used for virtual private gateway IPPEs in some implementations despite the possibility of lower overall resource utilization levels.

In at least some embodiments, a provider network may enable customers to set up "isolated virtual networks" (IVNs) at the provider's data centers. An IVN (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables etc. for the IVN. For at least some of the devices within an IVN in some embodiments, the network addresses may not be visible outside the IVN, at least by default.

In addition to enabling customers to set up logically isolated networks for their applications, IVNs may also be used by the provider network itself to support various features such as VPN connectivity in some embodiments. In order to enable connectivity between a customer's IVN and the customer's external network (e.g., devices at the customer's data center or office premises), a virtual private gateway (VPG) may be set up in one embodiment using a dedicated IVN whose network configuration settings are selected by administrative or control-plane components of the provider network, rather than by an external customer. Such a dedicated IVN used primarily or entirely for implementing a virtual private gateway may be referred to as a VPG-IVN to distinguish it from IVNs set up for implementing customer applications. The virtual private gateway may serve as a network concentrator on the provider network side of the path between a customer's data center and the customer's IVN within the provider network. In various embodiments one or more VPN (virtual private network) connections may be configured between a customer's IVN and external networks (such as the customer's office network or the customer's data centers) using IPPEs instantiated at compute instances within the VPG-IVN. A variety of different protocols may be used for connections between the customer IVNs and the external networks in different implementations—e.g., IPSec (Internet Protocol Security), SSL/TLS (Secure Sockets Layer/Transport Layer Security), DTLS (Datagram Transport Layer Security) or the like may be employed.

According to one embodiment, a set of programmatic interfaces (e.g., APIs, web pages, custom graphical user interfaces, command-line tools or the like) may be implemented by the provider network to enable customers to utilize VPN-related features of the provider network. Such interfaces may be used, for example, to request the establishment of a VPN connection, to terminate an existing VPN connection, to indicate client preferences regarding monitoring of VPN traffic, to submit queries regarding VPN traffic and/or to receive summarized/aggregated VPN performance metrics initially obtained at the intermediary devices such as IPPEs. A request via such a programmatic interface may be received, e.g., at a control-plane component of the provider network, to establish a VPN connection between (a) a customer data center of a particular customer C1 and (b) C1's IVN within the provider network. The connectivity manager may determine whether a compute instance-based virtual private gateway (VPG) has previously been set up on behalf of C1. If no such pre-existing VPG is found, a new IVN may be configured for a VPG to be established for the customer. The internal configuration of this special-purpose IVN (which, as mentioned earlier, may be referred to as a VPG-IVN) may be controlled by the control-plane components (in contrast to C1's IVN, for which networking configuration choices may be made by C1). In some embodiments, the control-plane component itself may comprise a plurality of physical and/or logical components that may be distributed across multiple data centers of the provider network.

In at least some embodiments, a plurality of compute instances may be launched within the VPG-IVN, e.g., at respective instance hosts used in single-tenant mode. For example, connectivity-related control-plane components may transmit instance launch requests specifying various characteristics of the instances required (e.g., the instance types or performance capabilities) for the VPG to the virtual computing service using the virtual computing service's API. In some embodiments, a pair of intermediary protocol processing engines (IPPEs) (e.g., each comprising one or more processes at a compute instance) may be started up in a primary-secondary fault-tolerant configuration at respective compute instances of the VPG-IVN. The establishment of respective VPN tunnels may then be initiated between the IPPEs of the pair and C1's data center. For example, in one implementation, the customer may invoke the equivalent of a "CreateVPNConnection" API followed by a "DescribeVPNConnection" API, and the response to the DesrcibeVPNConnection API may include configuration settings to be applied at the customer's gateway to establish the tunnels. In some implementations, only a single IPPE and a single VPN tunnel may be established instead of a pair of IPPEs and a pair of tunnels.

After the VPN tunnel or tunnels have been set up, network packets may begin to flow between client devices outside the provider network and the client's compute instances located within the provider network, and monitoring of the packets may be begun. The control-plane components of the provider network may include a VPN traffic analyzer in some embodiments, responsible for coordinating the collection of metrics at various intermediary devices and/or for transmitting summarized, aggregated or raw metrics to interested parties such as clients or VPN administrators. The traffic analyzer may itself comprise a plurality of components distributed at one or more provider network data centers in some embodiments. According to one embodiment, an intermediary such as an IPPE may examine the headers of a particular packet of a VPN connection, e.g., after decrypting the packet if it is received at the intermediary in encrypted form, and determine whether the packet is a candidate for monitoring. The decision as to whether the packet is a monitoring candidate may be made based on some combination of a variety of factors in different embodiments. For example, in one embodiment the customer on whose behalf a VPN connection is established may be provided with a set of packet categories which can potentially be monitored (such as for example Transmission Control Protocol (TCP) connection establishment handshake-related packets, Internet Control Message Protocol (ICMP) request/response packets, etc. as discussed below) and the customer may approve one or more such categories. In other embodiments, the traffic analyzer may select certain categories of packets as monitoring candidates, and/or determine sampling subsets of transferred packets as monitoring candidates (e.g., every $10^{th}$ TCP connection establishment handshake's packets may be selected as candidates).

To indicate that a given packet P1 has been selected as a monitoring candidate, an initial set of metadata regarding P1 may be stored at the intermediary—for example, a timestamp associated with the processing of P1 may be stored, a timeout period within which an acknowledgement or response with respect to P1 is expected to be received may be stored, information about the source and destination may be stored, a sequence number associated with P1 may be stored, and so on. The particular metadata that is stored may depend on the network protocol and the category of packet being examined. P1 may then be transferred towards its intended destination from the intermediary device. Packets that could be responsive to P1 (e.g., packets being transmitted in the reverse direction) may then be examined at the intermediary. In response to determining, based at least in part on an examination of one or more network protocol headers, that a second packet P2 comprises an acknowledgement or response to P1, one or more metrics associated with a monitored packet group comprising P1 and P2 may be stored by the intermediary at a persistent storage repository. A variety of metrics may be stored in different embodiments, including for example latency metrics, successful transmissions metrics, etc. If, in contrast, a packet containing an acknowledgement or response to P1 is not received within the timeout period, a metric indicative of dropped packets may be incremented in at least some embodiments in the repository. In at least some embodiments, the repository may store the metrics with corresponding timestamps indicating when the metrics were collected.

In various embodiments, the traffic analyzer may implement one or more programmatic interfaces for clients or other interested parties to submit queries regarding VPN traffic quality. In response to receiving, via such a programmatic interface, a traffic quality query pertaining to a given VPN connection, metrics collected for that VPN connection may be retrieved from the repository, optionally processed (e.g., to summarize the metrics or provide various aggregated measurements), and provided to the query submitter. In at least some embodiments, the metrics may be reported in the form of a time series, for example reporting various components of end-to-end latency averaged or otherwise aggregated over successive one-minute intervals as discussed below. The metrics reported may be organized into various sub-groups in some embodiments—e.g., metrics may be aggregated based on the direction of packet flow (inbound or outbound with respect to the provide network), the packet protocol and category, sub-paths of the overall endpoint-to-endpoint network path, etc. The metrics reports may be used, for example, to identify whether performance problems are occurring within the provider network or outside the provider network, to determine whether any proactive actions (such as the deployment of additional resources or changes to packet routing) should be undertaken, and so on.

In some embodiments, as mentioned above, several intermediary protocol processing engines (IPPEs) may be set up for a given virtual private gateway used for a VPN. At a given point in time, one IPPE of the plurality of IPPEs may be considered the primary or active IPPE, and its VPN tunnel may be considered the primary pathway of the VPN connection, while at least one of the other IPPEs and its tunnel may be considered secondary or standby resources. The primary IPPE may collect VPN traffic metrics for the selected categories of packets using the packet-matching approach discussed above. In response to a determination that a failure may have occurred at the primary IPPE (e.g., that a probability of a failure at the primary IPPE is above a threshold), a health monitoring service of the provider network may rapidly initiate a transition of the secondary IPPE to a primary role (including the packet monitoring responsibilities) in some embodiments. In order for packets to flow between specific customer devices in a customer C1's data center and various resources within C1's IVN, routing information may have to be exchanged for both ends of the VPN connection in at least some embodiments. In one embodiment, for example, the customer gateway may establish a respective BGP (Border Gateway Protocol) session with each of the two IPPEs. Customer-side routing information may be provided to the IPPEs using these BGP sessions. Within the provider network, in at least some embodiments a specialized routing service for VPNs may be implemented. The IPPEs may send the received customer-side routing information to the routing service, e.g., via an HTTPS (HyperText Transfer Protocol Secure) based or HTTP (HyperText Transfer Protocol) based internal routing information exchange API implemented by the routing service. The customer-side routing information may be stored within a persistent repository of the routing service, which may also include internal routing information pertaining to provider network resources (such as route settings of C1's IVN). Back-end rules engines of the routing service may analyze the collected internal and external routing information, e.g., in view of one or more routing policies of the provider network, to compute or select routes to be used for between various pairs of endpoints. The routing service may provide routing information pertaining to devices within C1's IVN to the pair of IPPEs in some embodiments. Such routing information may be translated into the appropriate BGP messages at the IPPEs, and provided to the customer gateway via the respective BGP sessions. Thus, the customer gateway may be informed regarding routes to C1's IVN, while the VPG set up for C1 may be informed regarding routes to the customer data center. Using the routing information, packets of customer C1's traffic may be transmitted in either direction between C1's data center and C1's IVN. Protocols other than IPSec, IKE, and/or BGP may be used in various embodiments.

In at least one embodiment, the provider network may support the use of "virtual network interfaces" (VNIs) that can be dynamically attached to or detached from a compute instance. VNIs may also be referred to as "elastic network interfaces" in some environments. A VNI may have a set of attributes, including for example at least one private IP address (e.g., an address that is not visible outside the provider network), security settings, a MAC (media access control) address, source/destination check flag settings, and the like, that can be transferred from one instance to another by programmatically detaching the VNI from the first instance and programmatically attaching it to the other instance. In some embodiments, one VNI may be created and attached to a compute instance at which an IPPE is implemented for encrypted traffic to or from the customer data center, while a second VNI may be created and attached to the compute instance for decrypted traffic to or from the customer's IVN. The second VNI may, for example, be configured with an IP address that belongs to a range of addresses set up for the customer's IVN.

In one embodiment, a single VPG may be usable for a variety of connectivity purposes. For example, consider a scenario in which a customer C1 has two data centers DC1 and DC2, each of which are to be connected to the same customer IVN via a respective VPN connection. To handle this use case, two pairs of IPPEs may be set up within a single VPG set up for C1: one pair of IPPEs (including a monitoring IPPE) for a pair of tunnels for the first VPN connection, and another (including a second monitoring IPPE) for a second pair of tunnels for the second VPN connection. In some cases, instead of using the instance-based VPG for secure connectivity between external data centers and customer IVNs, the VPG may be used for secure transmission of traffic between customer data centers, e.g., in a hub-and-spoke configuration. The hub-and-spoke layout may also be implemented using respective pairs of IPPEs at the VPG (the "hub") for each data center (a respective "spoke") and ensuring that the appropriate routing information is made available to at least one of the IPPEs of each pair (e.g., by a routing service similar to that discussed above). Network quality metrics pertaining to traffic flowing between the customer data centers may be collected at the IPPEs of the hub, and provided to a traffic analyzer from which the metrics may be obtained by clients.

Example System Environment

FIG. 1 illustrates an example system environment in which intermediary devices set up to establish secure connectivity between a customer data center and a customer's isolated virtual network (IVN) at a provider network may obtain performance metrics associated with virtual private network (VPN) connections, according to at least some embodiments. As shown, system 100 comprises a provider network 102 that includes a plurality of resources which may be used to implement a variety of network-accessible multi-tenant and/or single-tenant services. A virtual computing service of the provider network 102 may implement programmatic interfaces (e.g., APIs, web pages, command-line tools or the like) that enable customers to request allocation of virtualized compute servers called compute instances. In the depicted embodiment, the virtual computing service may also enable customers to request the establishment of isolated virtual networks (IVNs), such as C-IVN 124, within which at least some of the customer's instances may be launched. As mentioned above, a customer IVN may comprise a plurality of resources placed within a logically-isolated portion of the provider network, over which the customer is granted substantial administrative control with respect to various aspects of network configuration, such as the assignment of IP addresses to various devices, the establishment of subnets, and so on. At least some of the IP addresses assigned to IVN resources, such as customer CIs (compute instances) 120A and 120B may be "private", e.g., the addresses may not be accessible from the public Internet or from other customers' IVNs within the provider network. IVN functionality may in effect allow customers to dynamically increase or decrease the number of computing and/or storage resources that can be deployed for various applications, while maintaining a level of network isolation and security that is close to (or better than) the corresponding levels of isolation and security achievable at the customer's own data centers.

At least for certain types of applications, customers may wish to establish secure communication channels (e.g., using any appropriate VPN or Virtual Private Network protocol) between their external data centers and their IVNs.

For example, in the depicted scenario, secure connectivity may be needed between customer device 145A at customer data center (C-DC) 140, and customer CI 120A at C-IVN 124. In general, the customer may want to allow network traffic from any customer device 145 (e.g., 145A, 145B, etc.) at C-DC 140 to flow securely, despite the use of public Internet links 179, to any customer CI 120 within C-IVN 124. Similarly, secure transmission may be desired for packets flowing from any customer CI 120 within C-IVN 124 to any customer device 145 within C-DC 140, despite the fact that the path used may include public Internet links 179. A connectivity service of the provider network, which may include one or more computing devices that implement administrative or control-plane components referred to collectively herein as a connectivity manager 115, may implement a set of programmatic interfaces to support VPNs and/or other forms of secure communications between customer resources and provider network resources in the depicted embodiment. The programmatic interfaces may be used to request the establishment or teardown of VPN connections, provide client preferences regarding monitoring VPN and other connections, submit queries for performance metrics, and so on. In the depicted embodiment, a VPN traffic analyzer 117, which may be implemented as a subcomponent of the control plane of the connectivity service, may be responsible for coordinating the collection and processing of VPN-related performance metrics as described below. Raw VPN-related metrics generated at various devices of the provider network may be stored in a metrics repository 188 and extracted from the repository for processing, aggregation and presentation in response to client requests.

Using one of the programmatic interfaces of the connectivity manager 115, a customer may request an establishment of a VPN connection between C-DC 140 and C-IVN 124 in the depicted embodiment. If a virtual private gateway does not already exist for the specified network pair (i.e., the C-IVN and the customer data center network), a new virtual private gateway (VPG) may be configured for the requested VPN connection. A dedicated IVN 122 may be established by the connectivity manager 115 for the customer, and one or more IPPEs (intermediary protocol processing engines) may be started up on compute instances within the IVN to implement the VPG. Unlike C-IVN 124, whose networking configuration is (at least largely) controlled by the customer, the configuration of the IVN to be used for the VPG may be controlled by the connectivity manager 115. This second IVN may be referred to as a "VPG-IVN", to distinguish it from C-IVN within which the customer CIs are implemented. In the depicted embodiment, VPG-IVN 122's instances may be used primarily for connectivity purposes; thus, customer application code may typically not be executed within VPG-IVN 122. The number of IPPEs that are established for a given VPN connection, and the mappings between IPPEs and VPG-IVN compute instances and hosts, may differ in various embodiments. In the depicted embodiment, at least a pair 164 of IPPEs may be started up for the VPN connection between C-IVN 124 and C-DC 140—e.g., a primary IPPE 110A at a first compute instance VPG-CI-1, and a secondary IPPE 110B at a second compute instance VPG-CI-2. Each IPPE may comprise one or more processes or threads of execution, for example.

A respective VPN tunnel (e.g., 152A and 152B) may be established between each IPPE of IPPE-pair 164 and a customer gateway (CG) 160 of the customer's data center. The establishment of such a tunnel 152 may involve the transmission of a set of configuration information from the connectivity manager 115 to the customer data center, where one or more settings indicated in the configuration information may be applied to the customer gateway (CG) 160. In one implementation, for example, to initiate the VPN connection, a client process or thread at C-DC 140 may issue a "CreateVPNConnection" request programmatically. In response, a new object representing a yet-to-be-fully-configured VPN connection may be generated by the connectivity manager 115, and an identifier of the connection may be provided to the client. The client may then submit a "DescribeVPNConnection" request with the identifier as a parameter, and receive a set of configuration information and/or instructions. The instructions may include, for example, IP addresses of the IPPEs 110A and 110B which are designated as VPN endpoints within the provider network. In embodiments in which IPSec is to be used for the VPN, a secret key may also be provided in the DescribeVPNConnection response (or in response to an invocation of a different API). The key may be used in accordance with the IKE (Internet Key Exchange) protocol to set up a security association (SA) for each of two tunnels to be established between the customer gateway 160 and the IPPEs. In some embodiments, the IKE SA may then be used to establish an IPSec SA, and the IPSec SA may be used to encrypt subsequent data traffic over the VPN tunnels.

A single logical VPN connection between the customer data center and the customer's IVN may comprise two separate tunnels 152A and 152B in the depicted embodiment, although in other embodiments a single tunnel may be created per logical VPN connection. The term "dual-tunnel VPN connection" may be used herein to refer to the combination of two tunnels such as 152A and 152B configured for a single logical VPN connection. One of the tunnels (e.g., 152A) may be configured as the primary tunnel of the VPN connection (e.g., using the appropriate routing settings) in some embodiments. For example, tunnel 152A may carry a majority (or all) of the VPN traffic between customer device 145A (which sends its outbound traffic to customer gateway 160) and customer CI 120A (which sends its outbound VPN traffic to IPPE 110A via a primary internal path 171, and similarly, receives inbound VPN traffic from IPPE 110A via primary internal path 171). The VPN tunnels may typically be used for encrypted data packets (e.g., to avoid security breaches over public Internet links 179), while the packets on the internal paths may at least in some embodiments be unencrypted. In at least some embodiments, the secondary IPPE 110B may also be used for at least some of the VPN traffic between the customer data center and customer CI 120A (e.g., via secondary internal path 172). In some embodiments, the secondary IPPE may be granted the primary role on the event of a failure at the primary IPPE (or in the event that the probability of a potential failure of the primary IPPE, as estimated by a health management service, exceeds a threshold). In one embodiment, in response to a detection of an overload condition at the primary IPPE, some of its workload may be offloaded to the secondary IPPE by making the appropriate network configuration changes. In the depicted embodiment, traffic entering or leaving the provider network may also pass through edge-layer devices 150, such as an edge router.

The VPN traffic analyzer 117 may select, for a given logical VPN connection, the categories of packets (if any) that are to be monitored at the IPPEs in the depicted embodiment. For example, in one embodiment packets transmitted during TCP connection establishment or teardown may be monitored, while in other embodiments data packets transmitted during the lifetime of an established TCP connection may also or instead be tracked. In some implementations clients may select packet types to be monitored from among a set of monitoring candidate categories, while in other embodiments at least some types of packets may be monitored by default. A wide variety of packet monitoring categories may be supported in different embodiments, with at least some of the categories comprising packet types which can be matched as request/response pairs or message/acknowledgement pairs. In at least some embodiments, only a subset of the selected packet types may be selected for monitoring—e.g., a sample comprising 10% of TCP establishment handshake packets may be monitored. After the decision regarding the kinds of traffic to be monitored is made, messages indicating the to-be-monitored categories may be sent to the appropriate IPPEs. A given IPPE 110 may receive an encrypted packet from customer data center 140, decrypt it, and examine one or more headers to determine whether the packet is a candidate for monitoring. If the packet is identified as a candidate for monitoring (e.g., if the packet belongs to a category approved for monitoring), a first set of metadata may be stored in a local cache at the IPPE 110. The first set of metadata may include, for example, timing information (such as a timestamp), source and destination addresses, sequence numbers, etc.; the specific metadata stored may depend on the packet category and the protocol (e.g., different metadata may be stored for TCP packets versus User Datagram Protocol (UDP) packets in one embodiment). A timer may be started up in some implementations representing a maximum time interval within which an acknowledgement or response is expected from the destination to which the candidate packet is directed.

After a particular inbound packet P1 (i.e., a packet directed from C-DC 140 to C-IVN 124) is selected as a monitoring candidate, the IPPE 110 may begin examining packets sent in the reverse direction (i.e., from C-IVN 124 to C-DC 140), e.g., in an attempt to determine whether the outbound packet contains an acknowledgement or response to P1. Acknowledgements or responses may be identified with the help of the metadata that was saved earlier with respect to P1—e.g., one or more headers of an outbound packet P2 may be read to determine whether the destination of P2 matches the source of P1, whether the packet type represents a response/acknowledgement, and/or whether a sequence number indicated in P2 is the expected sequence number with respect to P1. If an outbound packet P2 (which may be received at the IPPE in unencrypted form) is identified as a match for P1, metrics corresponding to a monitored packet group comprising P1 and P2 may be stored in repository 188 before an encrypted version of P2 is sent on towards its intended destination. The metrics may include, for example, estimates of latency within the provider network and outside the provider network, successful packet delivery rates, etc. At least some of the metrics may be approximate rather than exact—e.g., in one implementation the time taken for a given packet to reach the targeted customer compute instance 120 from the IPPE may be assumed to be one half of the total time taken between the send timestamp of the decrypted packet from the IPPE and the receive timestamp of the response packet at the IPPE.

If no response/acknowledgement is received for a given inbound packet P1 within the timeout period selected for that packet, a metric indicative of a dropped packet may be stored or updated in the repository 188, e.g., under the assumption that either the unencrypted version of P1 was lost on its way to its intended destination, or the outbound unencrypted response was lost. In at least some embodiments, the metrics may be stored temporarily in a local cache at the IPPE where they are generated, and transferred to repository 188 in batches. In one embodiment in which a pair of IPPEs (such as 110A and 110B) are configured as a primary-secondary pair, the metrics and metadata collected at either IPPE of the pair may be replicated at the other IPPE, e.g., periodically, so that the secondary IPPE is better prepared to take over the monitoring-related responsibilities of the primary IPPE. In response to a VPN traffic query from a client or an administrator of the provider network, saved metrics pertaining to the appropriate monitored packet groups may be retrieved from the repository 188 by the traffic analyzer 117, optionally processed (e.g., to produce a time series of aggregated/averaged data values) and provided to the requester in the depicted embodiment. It is noted that in at least some embodiments, the metrics provided by the traffic analyzer may not be required to be exact—that is, an approximate indication of network quality may suffice for most purposes. As such, it may be acceptable for the metrics collection and reporting components to lose a small fraction of the collected metrics, or to not gather metrics for 100% of the packets, as long as the metrics that are collected and reported provide a reasonable approximation of the actual traffic conditions.

Packet Flow Details

Figure 2:
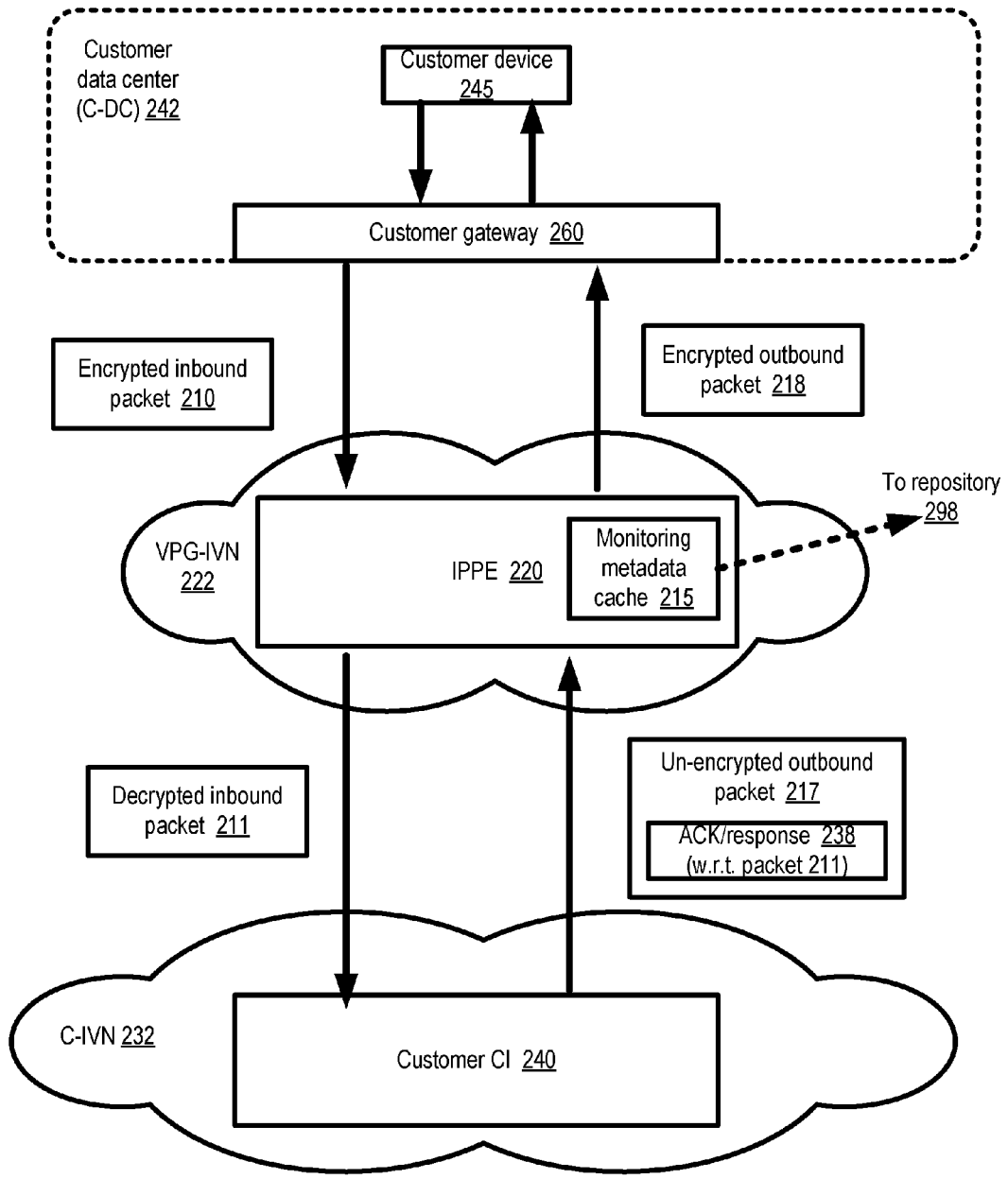
FIG. 2 illustrates the flow of encrypted and decrypted packets associated with VPN connections at a provider network, according to at least some embodiments.

FIG. 2 illustrates the flow of encrypted and decrypted packets associated with VPN connections at a provider network, according to at least some embodiments. A packet destined for a customer compute instance 240 may initially be generated at a customer device 245. The packet may be transmitted from the device 245 to a customer gateway 260 at the customer's data center 242. In some embodiments the packet may be encrypted at the customer gateway 260, or at some other encryption module within the customer data center. The encrypted inbound packet 210 may be received at an intermediary protocol processing engine (IPPE) 220 at the virtual private gateway IVN 222. The IPPE may decrypt the packet and determine, e.g., based on the IPPE's monitoring configuration settings with respect to the logical VPN connection over which packet 210 is transmitted, that packet 210 is a monitoring candidate. A set of metadata pertaining to packet 210, indicative of the fact that packet 210 has been identified as a monitoring candidate, may be stored in local monitoring metadata cache 215. A variety of metadata entries may be stored in cache 215 in different embodiments, including, for example, some combination of the time at which the encrypted version of the packet is received at the IPPE, the time at which the decrypted version 211 of the packet is sent on towards the customer IVN 232, values of various headers such as source/destination IP addresses, sequence numbers, packet type flags (e.g., TCP SYN or FIN flags), a protocol identifier (e.g., a value indicating that the protocol being used is TCP, UDP, etc.). In at least some embodiments the cache 215 may be implemented in the main memory of the instance host at which the compute instance comprising the IPPE is established.

The decrypted version 211 of the packet may then be transmitted to the customer compute instance 240 at customer IVN 232. The IPPE 220 may examine subsequent outbound packets such as unencrypted outbound packet 217 to determine whether the outbound packet comprises an acknowledgement or response with respect to the inbound packet. If an un-encrypted outbound packet 217 comprises an acknowledgement or response 238 for packet 211, which may be determined by matching one or more header entry values of the outbound packet with header values saved in cache 215, metrics for the packet group comprising packets 211 and 217 (or their respective encrypted packets 210 and 218) may be stored in cache 215, such as the latency of transmission between the IPPE and the customer CI 240. The outbound encrypted packet 218 corresponding to un-encrypted packet 217 may be generated at the IPPE in accordance with the appropriate encryption technique and sent on towards the customer device 245.

Some packet flows may originate at the customer IVN 232, instead of originating at a customer data center 242. For such flows, the initial monitored packet may be received in un-encrypted form at the IPPE 220, a decision may be made as to whether the packet is a candidate for monitoring, and similar types of metadata entries may be stored in cache local 215. An inbound packet representing an acknowledgement or response may be identified after decryption, and latency associated with network paths outside the provider network may be estimated and stored in the cache 215. The locally-stored metrics may be transmitted to a repository 298, e.g., at selected intervals, in the depicted embodiment. In some cases, a packet may be rejected as a monitoring candidate based on the amount of resources that are currently being used for monitoring other packet flows—e.g., if the cache is full, a new packet may be rejected for monitoring in some implementations. In other embodiments, a previously-stored set of metadata may be removed from the cache 215 to make way for the metadata associated with a newly-received packet.

Figure 3:
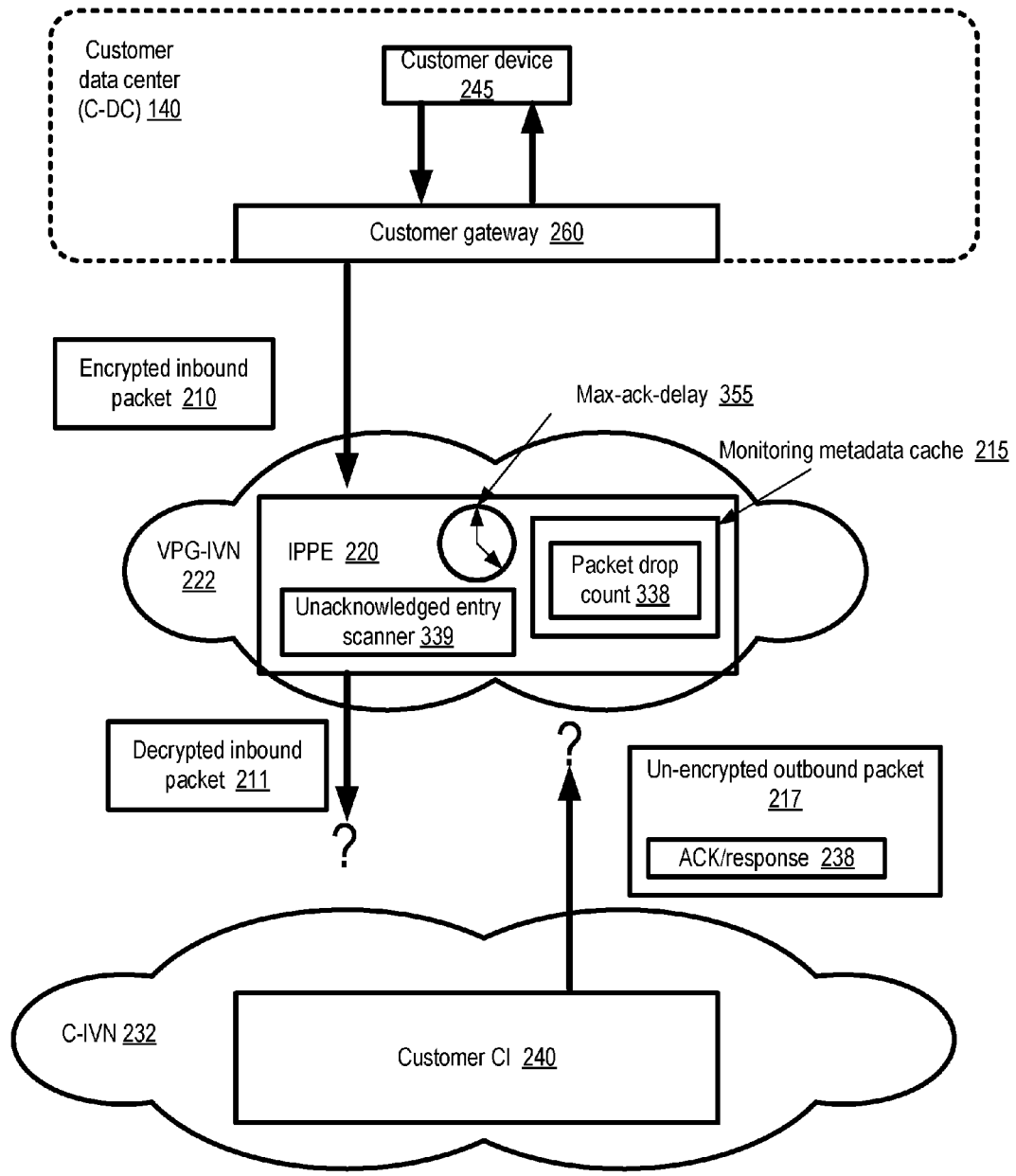
FIG. 3 illustrates the use of timeouts at an intermediary device to obtain packet drop-related metrics, according to at least some embodiments.

Of course, it may sometimes be the case that packets being transmitted via a VPN are lost or dropped. FIG. 3 illustrates the use of timeouts at an intermediary device to obtain packet drop-related metrics, according to at least some embodiments. In the depicted embodiment, a maximum acknowledgement delay 355 may be set to an expected duration within which a corresponding response/acknowledgement packet is expected to be received. If no such acknowledgement or response is received before the timeout expires, this may be assumed to because either the inbound decrypted packet 211 or the corresponding response packet 217 was dropped or lost. Accordingly, instead of updating latency information in cache 215, a metrics of dropped packets (such as packet drop count 2338) may be incremented. In some implementations, a different approach may be taken with respect to accounting for dropped packets. Instead of starting a timer for each packet to which a response or acknowledgement is expected, which may require a large number of timers in busy networks, metadata entries for the as-yet-unacknowledged packets may be examined periodically, e.g., by an unacknowledged entry scanner 339. If, during such a scan, it is determined that the amount of time which has elapsed without receiving an acknowledgement for a particular packet has exceeded a threshold (e.g., based on comparing the current time with a send timestamp stored in the metadata for the unacknowledged packet), the dropped packet metrics may be incremented.

In various embodiments, after all the metrics that the IPPE is configured to gather for a given monitored packet group (e.g., for an inbound packet and its acknowledgement/response, an outbound packet and its acknowledgement/response, or an unacknowledged packet whose maximum acknowledgement delay has been exceeded) have been collected and transmitted to the metrics repository 298, the metadata entries that were previously generated for that packet group may be discarded. In at least some embodiments, the maximum number of concurrently monitored packet groups may be limited by the maximum capacity of the metadata cache 215 at the IPPE. If, for example, a cache can store metadata entries for K monitored packet groups, and a (K+1)th candidate for monitoring is identified, the IPPE may in some embodiments discard some number of metadata entries from the cache to clear space for the more recent packet group's metadata. A sliding window of the most recent K metadata entries may be retained in such an embodiment. In other embodiments, the decision-making logic as to whether a given received packet is a candidate for monitoring may take the cache capacity into account—e.g., if the cache is full, the received packet may be rejected as a monitoring candidate.

Examples of Monitored Packet Categories

Figure 4:
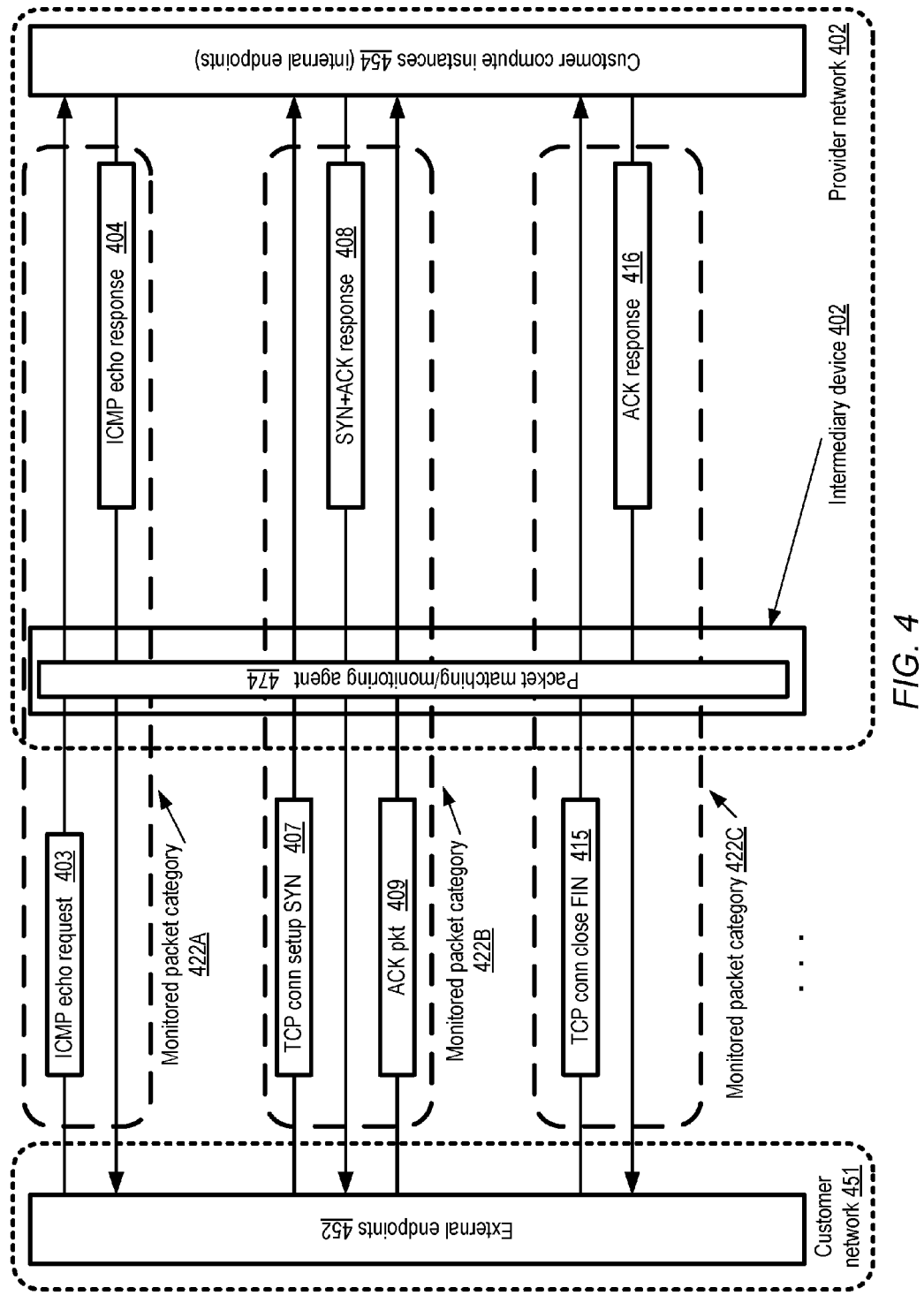
FIG. 4 illustrates examples of packet categories for which performance metrics may be determined at VPN intermediary devices, according to at least some embodiments.

FIG. 4 illustrates examples of packet categories for which performance metrics may be determined at VPN intermediary devices, according to at least some embodiments. Monitored packet category 422A comprises client-issued ICMP (Internet Control Message Protocol) echo request packet 403 and a corresponding echo response packet 404. The echo request packet 403 may be sent from an external endpoint 452 at a customer network 451 to an internal endpoint within the provider network such as a customer compute instance 454 along a path which includes an intermediary device (such as an IPPE of the type described above) 402. The intermediary device may comprise a packet matching/monitoring agent 474 responsible for storing timestamps and other metadata, keeping track of unacknowledged packets, and so on. The echo response packet 404 may be sent in the reverse direction, e.g., from the internal endpoint to the external endpoint in the depicted example. The ICMP echo request and response packets may be generated as a result of a client-issued "ping" command, for example.

Monitored packet category 422B includes three kinds of packets which may be used during a TCP connection setup handshake procedure. A SYN packet 407 from an external endpoint may initiate the three-way handshake in the depicted example. If the internal endpoint can set up the requested connection, a SYN ACK packet 408 may be sent in response to the connection requester, and the handshake may be completed by the requester sending an ACK packet 409 to the internal endpoint. It is noted that category 422B corresponds to a successful connection establishment workflow. If the receiver were to decline the TCP connection request associated with SYN packet 407, a reset (RST) packet may be sent instead of the SYN ACK packet 408, and the RST packet may be used to generate metrics in a manner analogous to the way the SYN ACK packet would be used. As indicated by the example of category 422B, in some cases more than two packet types may be included in a single monitored packet category.

Monitored packet category 422C includes packets used for an active close of a TCP connection. A FIN packet 415 may be sent by the initiator endpoint of the close to the second endpoint with which the connection has been established, and a corresponding ACK packet 416 may be transmitted in the reverse direction.

While the initial packet of each of the example categories shown in FIG. 4 originates outside the provider network 402 and is directed to a compute instance within the provider network, the flow of monitored packets may also proceed in the reverse direction in various embodiments. Thus, for example, an ICMP echo request packet may be sent from a customer compute instance to an external endpoint, or a TCP connection establishment request may be sent from a customer compute instance to an external endpoint, with the corresponding response packets flowing into the provider network. With respect to each packet category 422, the packet matching/monitoring agent 474 may examine the un-encrypted or decrypted headers of the packet and use associated metadata to generate one or more types of metrics for a particular group of packets of the category. It is noted that although only three monitored packet categories 422A, 422B and 422C are shown in FIG. 4 by way of example, a number of other packet flows may be selected for monitoring in various embodiments. In at least one embodiment, for example, the headers of packets containing customer-generated data of an in-use connection (instead of, or in addition to, administrative packets such as those used to set up or tear down a connection) may be examined, with acknowledgements being identified using sequence numbers, and metrics may be collected for such data packets. Especially for long-lasting connections, collecting metrics for ordinary customer-data-containing packets may be worthwhile, because the fraction of packets used for connection establishment or teardown may be very small.

Intermediary Protocol Processing Engines

Figure 5:
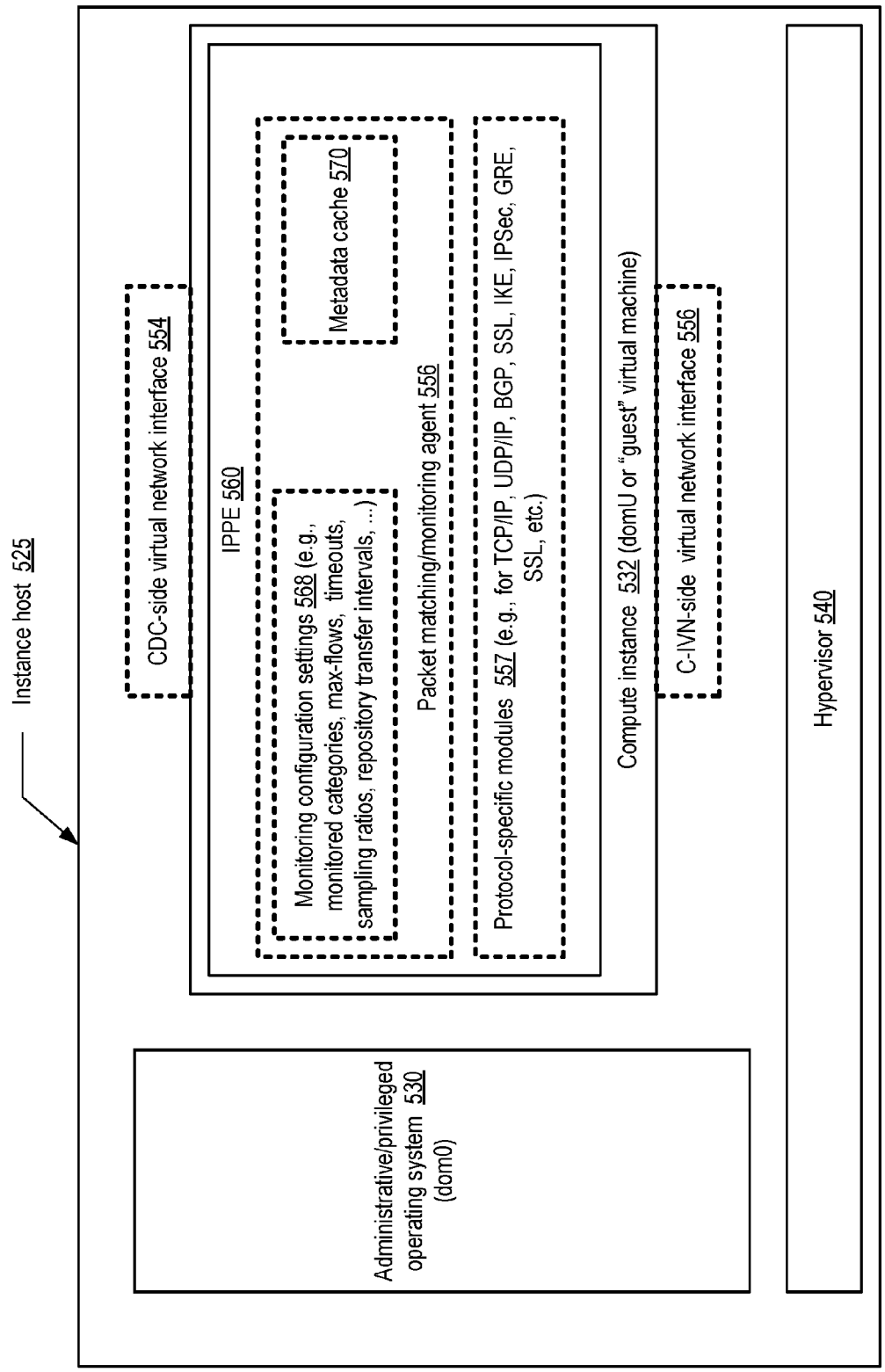
FIG. 5 illustrates example subcomponents of an instance host at which an intermediary protocol processing engine (IPPE) may be established, according to at least some embodiments.

FIG. 5 illustrates example subcomponents of an instance host at which an intermediary protocol processing engine (IPPE) may be established, according to at least some embodiments. A virtual computing service of the provider network may include numerous instance hosts, each of which may be capable of hosting multiple instances. In the depicted embodiment, an IPPE 560 is implemented at a compute instance 532 of an instance host 525. The instance host 525 may comprise a plurality of hardware components (not shown in FIG. 5), which may include, for example, some number of processing cores or processors, at least one non-persistent memory which may be referred to as a main memory, one or more local persistent storage devices such as disks, and one or more network interface cards (NICs). Optional peripheral devices such as one or more monitors, mice, and the like may also be attached to the virtualization host in some implementations.

The hardware resources of the instance host 525 may be virtualized (e.g., presented to one or more virtual machines such as compute instance 532 booted or launched at the instance host as though each of the instances had exclusive access to the hardware) with the help of a virtualization management software stack that comprises a hypervisor 540 and/or an administrative instance of an operating system 530 in the depicted embodiment. The administrative instance of the operating system may be referred to as a "privileged domain" labeled "domain 0" or "dom0" in some implementations, while respective operating systems established for each of the compute instances 532 may be referred to as "unprivileged domains" (labeled "domU"), "guest virtual machines", "guest operating systems", or "guest domains". When a hardware component (such as a NIC used for incoming or outgoing traffic of the IPPE 560) is to be utilized by a compute instance 532, e.g., due to an operation requested by the operating system or by an application running on top of the operating system, the hypervisor 540 may typically act as an intermediary between the instance and the hardware component. In some cases, depending for example on the programmatic interfaces being used, both the hypervisor 540 and the administrative operating system instance 530 may be intermediaries between the instance and the hardware. In some embodiments, at least some of the virtualization management logic (e.g., corresponding to some of the functions performed by hypervisor 540 and/or the administrative operating system instance 530) may be implemented at a peripheral I/O device.

In the depicted embodiment, the IPPE 560 configured at compute instance 532 comprises a number of subcomponents, such as a packet matching/monitoring agent 556 and one or more protocol-specific modules 557. The agent 556 may be responsible for, among other functions, receiving and storing monitoring configuration settings 568, maintaining local metadata cache 570, and communicating with the VPN traffic analyzer and the VPN metrics repository (not shown in FIG. 5). The configuration settings 568 (some of which may be determined at the VPN traffic analyzer based on interactions with customers as discussed below in some embodiments) may include, for example, the particular categories of packets that are to be monitored, the maximum number of packet flows (max-flows) for which monitoring is to be performed concurrently, the timeouts associated with receiving acknowledgements/responses for various monitored packets, the sampling ratios (if sampling is being used) indicating the fraction of packets of a given category which are to be monitored, the intervals at which metadata or metrics are to be transferred to the metrics repository and/or to a secondary IPPE, and so on.

The IPPE 560 may in some embodiments comprise one or more processes or threads running on the compute instance. In at least some embodiments, a compute instance 532 may be primarily intended for use as an IPPE, e.g., there may not be any other significant consumers of processing, memory, storage or networking resources at the instance than the IPPE (and the underlying operating system). A given IPPE may be able to process messages of a number of different protocols in some embodiments using respective protocol-specific modules. For example, IPPE 360 may include respective modules associated with protocols such as TCP/IP, UDP/IP, BGP, IKE, IPSec, SSL/TLS GRE (Generic Routing Encapsulation), the provider network's proprietary routing service protocols, and so on. In some embodiments, at least some of the components of the IPPE may be implemented as respective daemons, processes or threads.

In some embodiments, compute instance 532 may have at least two virtual network interfaces (VNIs) attached for use by the IPPE. VNI 554 may be used primarily for communications with the customer data center (e.g., communications with a customer gateway) and is hence labeled a "CDC-side VNI" in FIG. 5. VNI 556 may be used primarily for communications with the customer's IVN, and is hence labeled a "C-IVN-side VNI" in FIG. 5. Other VNIs may also be attached to IPPE 560's compute instance 532 in some embodiments, e.g., for control-plane interactions with the VPN traffic analyzer and/or the VPN metrics repository.

Monitoring VPN Traffic Between Customer Data Centers

Figure 6:
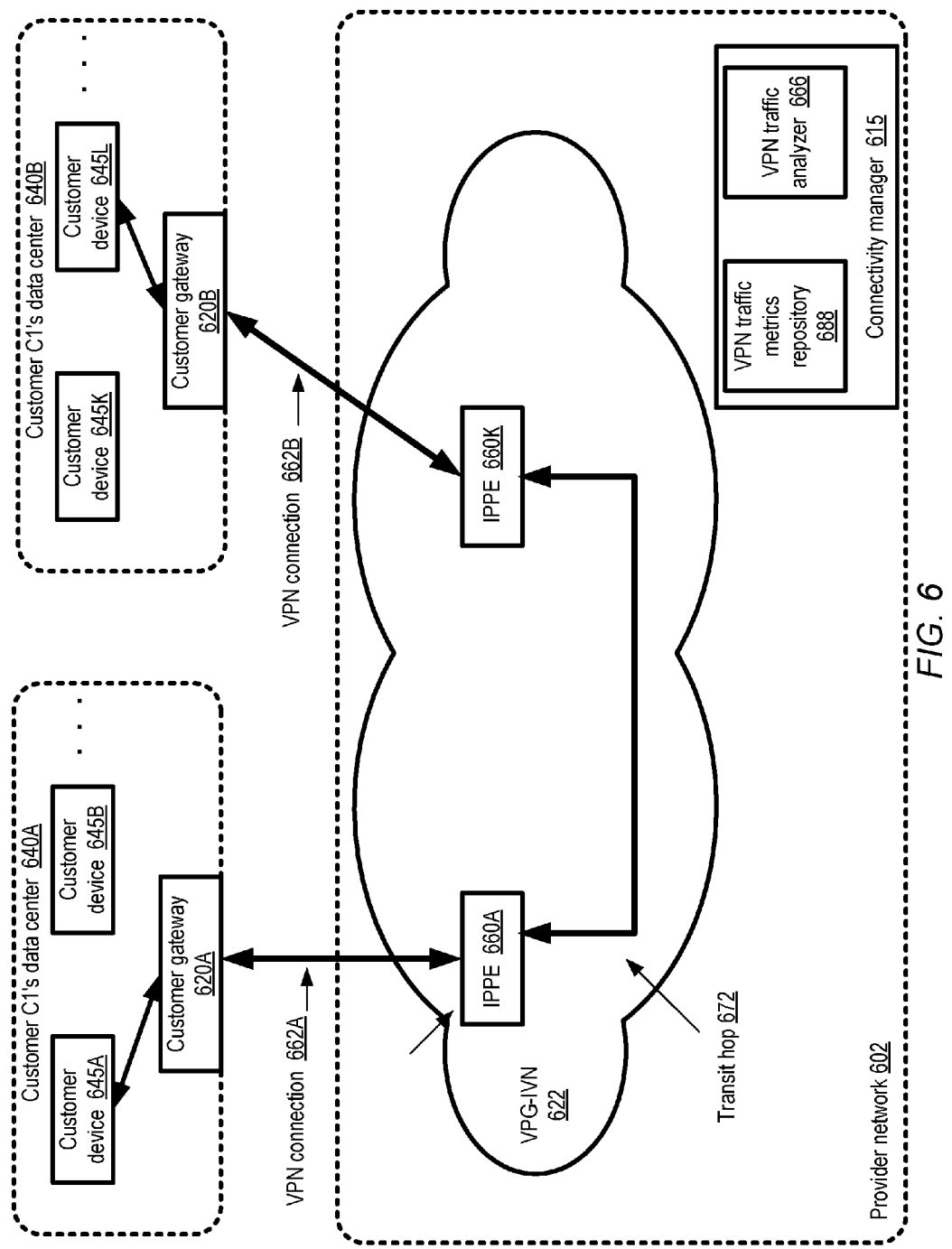
FIG. 6 illustrates an example of a hub-and-spoke connectivity configuration in which VPN performance metrics may be collected at intermediary devices with respect to traffic flowing between two customer premises, according to at least some embodiments.

In some cases, customers may wish to utilize the provider network resources for secure connectivity between different data centers, instead of or in addition to establishing secure connectivity between the data centers and the customer's IVNs. A virtual private gateway comprising one or more IPPEs may serve as a hub of a hub-and-spoke configuration in such scenarios, with respective VPN connections to the data centers as the spokes of the configuration. FIG. 6 illustrates an example of a hub-and-spoke connectivity configuration in which VPN performance metrics may be collected at intermediary devices with respect to traffic flowing between two customer premises, according to at least some embodiments. In the depicted embodiment, one or more IPPEs (such as IPPE 660A) may be used for communications between the VPG-IVN 622 of provider network 602 and a first customer data center 640A, and a second set of one or more IPPEs (such as IPPE 660K) may be used for communications between the VPG-IVN 622 and a second customer data center 640B. In some embodiments, an API specifically for the establishment of VPNs between customer data centers may be supported by a connectivity manager 615 (e.g., as distinct from an API for establishing VPNs between customer data centers and customer IVNs).

In the depicted embodiment, a single IPPE with a respective VPN connection 662 (e.g., 662A and 622*b*) is shown connected to each customer data center. As in the example shown in FIG. 1, a pair of IPPEs may be configured for VPN connectivity with each customer data center in some embodiments, with one IPPE of the pair designated as the primary and the other IPPE of the pair designated as secondary. After an encrypted packet (whose contents were originally generated at customer device 645A and destined for customer device 645L) is received from customer gateway 620A and decrypted at IPPE 610A in the depicted embodiment, for example, the packet may be transmitted over transit hop 672 to IPPE 610K. At IPPE 610K, the packet may be encrypted and sent to the customer gateway 620B on its way to the destination customer device 645L. IPPEs 610A and 610B may collaborate to generate performance metrics for the packets being transmitted between customer data centers 640A and 640B in the depicted embodiment. End-to-end latency measures may be broken down into three parts, for example: the latency for transmissions between customer data center 640A and the VPG-IVN 622, the latency within VPG-IVN 622, and the latency between VPG-IVN 622 and customer data center 640B.

Programmatic Interactions

Figure 7:
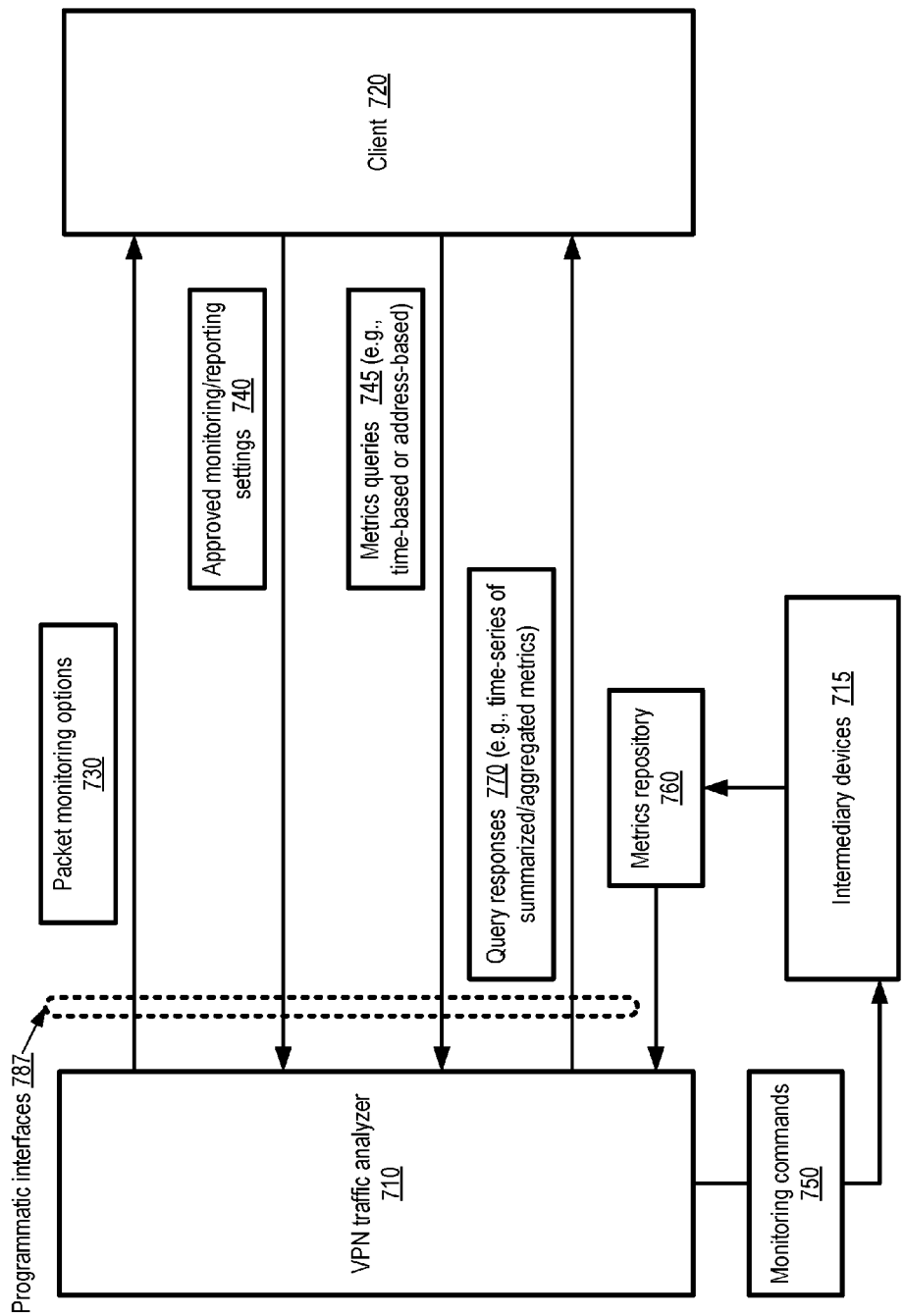
FIG. 7 illustrates example programmatic interactions between a VPN traffic analyzer and a client, according to at least some embodiments.

FIG. 7 illustrates example programmatic interactions between a VPN traffic analyzer and a client, according to at least some embodiments. As mentioned earlier, a VPN traffic analyzer 710 may implement one or more programmatic interfaces 787 for client interactions, such as a web-based console, a set of application programming interfaces (APIs), command line tools, or graphical user interfaces. In the depicted embodiment, a set of VPN packet monitoring options 730 may be provided to a client 720 (e.g., a program running at a customer's computing device). The options may indicate, for example, several different monitored packet categories such as those discussed earlier in the context of FIG. 4, and several different modes of monitoring and reporting. In one monitoring mode, for example, approximately N percent of the packets of a selected category may be sampled, while in another mode, the intermediary devices configured for the VPN connection may attempt to monitor all packets of a selected category. One of the options may indicate that monitoring will be performed by default for all the VPN connections, while in another mode the customer may enable monitoring for specific connections. With respect to reporting the results of the monitoring, the options may include a continuous reporting mode (in which, for example, a time series of raw or aggregated metrics values are provided to the customer unconditionally), or a threshold-driven mode in which metrics are reported only if they meet customer-selected or analyzer-selected threshold criteria. In some embodiments the monitoring options 730 may be indicated to the client 720 in interactions associated with a customer's initial request for a VPN connection; in other embodiments the options may be provided in response to a specific programmatic request to enable VPN traffic monitoring. One of the options provided in some implementations may include disabling VPN traffic monitoring entirely.

The client may transmit an indication of a set of approved monitoring settings 740 (e.g., the categories of packets to be monitored, the modes of monitoring and reporting, etc.) selected from the available options to the traffic analyzer 710 via the programmatic interfaces 787 in the depicted embodiment. The traffic analyzer 710 may transmit corresponding monitoring commands 750 to the appropriate set of intermediary devices 715 traversed by the VPN packets for which metrics are to be collected. The commands 750 may include configuration settings which can be used at individual intermediary devices (such as the IPPEs discussed above) to allocate the appropriate amount of memory, launch one or more matching/monitoring threads, determine timeouts for various types of responses, etc. Based on the configuration settings, the intermediary devices 115 may generate latency, packet loss and/or other metrics for selected VPN connections, and transfer the metrics to a repository 760 in the depicted embodiment.

Depending on the reporting options selected, the data obtained at the intermediary devices may be provided to the client in various ways. In the depicted embodiment, the client 720 may submit one or more kinds of traffic metrics queries 745 to the traffic analyzer using programmatic interfaces 787. The query parameters may indicate, for example specific time periods for which traffic quality metrics are desired, or specific addresses (e.g., ranges of IP addresses outside the provider network or within the customer's IVN) for which traffic quality metrics are desired. The traffic analyzer may obtain metrics for the appropriate monitored packet groups from the repository 760 based on the query parameters and provide them to the client 720. In one embodiment, for example, the raw metrics may be converted into a time series of values, with averages (or other aggregated values such as maxima or minima) computed for selected successive time intervals.

The metrics obtained at the intermediary devices of the VPN connections may be aggregated or divided along several dimensions. FIG. 8 illustrates examples of VPN traffic metrics which may be provided to a client of a provider network, according to at least some embodiments. In the depicted embodiment, time series of values for several different metrics are displayed for a specified VPN with identifier "VPNID". Metrics for inbound traffic (i.e., packets directed to a customer IVN labeled IVN-ID from outside the provider network PN1) are shown in table 805, and metrics for outbound traffic (i.e., packet directed from the customer's IVN to a customer network outside the provider network PN1) are shown in table 810.

With respect to both inbound as well as outbound traffic, information about multiple packet categories may be displayed in the depicted embodiment, such as categories Cat1, Cat2, etc. The metrics displayed for each time interval may include the total count of monitored packets in the interval, the average latency outside the provider network PN1, the average latency within the provider network PN1, and the packet loss rate expressed as a percentage. In various embodiments customers may modify parameters with respect to the displayed metrics—e.g., the time intervals corresponding to each set of metrics (set to one minute in the depicted example) may be adjusted, the particular types of metrics reported may be selected, the manner in which the metrics are aggregated (e.g., whether metrics for inbound and outbound packets are displayed separately or together) may be changed, and so on. In some embodiments the metrics may be updated automatically as they are obtained—e.g., a web-based interface displaying the metrics may be refreshed at specified time intervals. In one embodiment, various filters may be applied to the data at the customer's request—e.g., only metrics for packets directed to or from specified address ranges may be provided, and so on.

Methods for Providing VPN Traffic Quality Metrics

Figure 9:
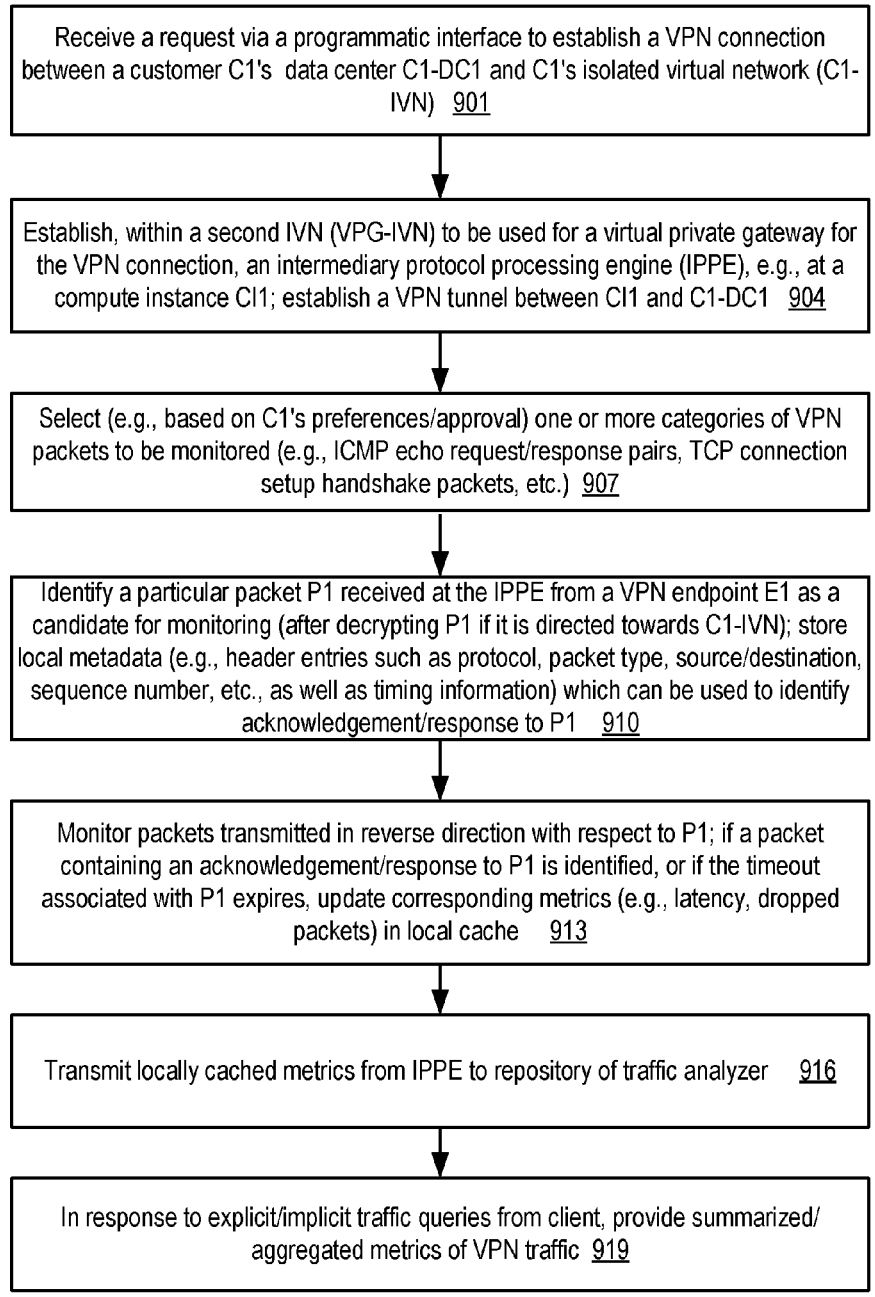
FIG. 9 is a flow diagram illustrating aspects of operations that may be performed to provide VPN traffic performance metrics at a provider network, according to at least some embodiments.

FIG. 9 is a flow diagram illustrating aspects of operations that may be performed to provide VPN traffic performance metrics at a provider network, according to at least some embodiments. A connectivity service of a provider network (e.g., a service responsible for implementing VPNs and other types of connections between external networks and customer compute instances within the provider network) may define and expose a set of programmatic interfaces for connectivity establishment, configuration and monitoring. As shown in element 901, a request may be received via one such interface from a client C1 at a connectivity manager or some other control-plane component of the connectivity service, requesting the establishment of a VPN connection between C1's data center (C1-DC1) and C1's IVN (C1-IVN) within the provider network.

The connectivity manager may attempt to determine whether a VPG (virtual private gateway) has already been established for connectivity to C1-IVN, e.g., in response to an earlier VPN connection request for some other data center of C1. The connectivity service may have a configuration database that can be searched by customer, by IVN, or based on other query parameters, for example. If no such pre-existing VPG is found, a new VPG may be established. A new IVN may be configured specifically for the VPG by the connectivity manager, and a selected number of IPPEs may be instantiated at one or more compute instances within the newly configured VPG-IVN (element 904). The number of IPPEs created, the mappings of the IPPEs to instances, and the types/sizes of the instances may vary from one implementation to another. In some embodiments, each IPPE may have a pair of virtual network interfaces (VNIs) configured, with one VNI of the pair to be used for encrypted traffic between the customer data center and the IPPE and the other VNI to be used for decrypted traffic between the IPPE and C1-IVN. One or more VPN tunnels may be established between the IPPE(s) and the customer data center. The procedure for establishment of the tunnels may vary, depending on the specific VPN protocol being used—for example, in an embodiment in which IKE and IPSec are being used, keys and IP addresses may programmatically be provided for a customer gateway at the customer data center. After the tunnels have been set up, routing information may be exchanged in both directions. For example, routing information pertaining to C1-IVN may be sent to the customer gateway via a tunnel, and routing information pertaining to the customer data center may be received from the customer gateway at the IPPE(s). Using the routing information, customer C1's data packets may be transmitted in either direction along the VPN pathway. For example, packets originating at a customer device within C1-DC1 may be encrypted at the customer gateway, sent in encrypted form to one of the IPPEs, decrypted at the IPPE and sent via an internal pathway within the provider network to a destination customer instance within C1-IVN. Similarly, packets generated at a customer instance within C1-IVN may be sent in un-encrypted form to an IPPE of the VPG, encrypted at the IPPE, and sent to the customer gateway at C1-DC1 for decryption on its way to a targeted customer device at C1-DC1.

As shown in element 907, one or more categories of packets to be monitored may be identified, e.g., based on client-specified preferences. In one embodiment, for example, a traffic analyzer component of the connectivity service may provide a list of packet categories form which monitoring is supported (such as packets involved in TCP connection establishment or teardown, ICMP echo request/response pairs, regular data packets, and the like), and a client may approve some or all of the categories. When a packet is received at an IPPE from a VPN endpoint E1, it may be decrypted if it is received in encrypted form. The packet may be identified as a monitoring candidate based on one or more criteria—e.g., if it belongs to an approved monitoring category, if sufficient resources are available for storing/managing its metadata and so on. In some embodiments, only a subset of packet belonging to an approved category (e.g., a random sample of 10% of the packets of the category) may be selected for monitoring. If a particular packet P1 is selected for monitoring, metadata indicating its selection may be stored, e.g., in a local cache at the IPPE in the depicted embodiment (element 910). A variety of different metadata elements may be stored in different embodiments, including for example a timestamp, a network protocol identifier, a source address, a destination address, a sequence number (or an acknowledgment number), and/or a packet type flag.

The IPPE may monitor packets transmitted in the reverse direction with respect to P1 (element 913). If a packet containing an acknowledgement/response to P1 is identified, or if the timeout associated with P1 expires, corresponding metrics (e.g., latency metrics, dropped packets metrics etc.) may be updated in a local cache in the depicted embodiment. The locally generated metrics may be transmitted from the IPPE to a storage repository accessible to the traffic analyzer (element 916). The traffic analyzer may extract relevant subsets of the metrics from the repository, and aggregate/summarize them along various dimensions to respond to explicit or implicit traffic quality queries (element 919).

It is noted that in various embodiments, operations other than those illustrated in the flow diagram of FIG. 9 may be used to implement the VPN traffic quality monitoring and reporting techniques described above. Some of the operations shown may not be implemented in some embodiments or may be implemented in a different order, or in parallel rather than sequentially. In at least one embodiment, other types of networking intermediaries (such as routers and the like) may be used for metrics collection instead of or in addition to IPPEs implemented at compute instances.

Use Cases

The techniques described above, of collecting metadata associated with customer-generated VPN traffic at intermediary devices such as protocol processing engines established at compute instances may be useful in a number of scenarios. As more and more customer applications are migrated to provider networks, the number of secure channels between customer data centers or office premises and resources within the provider network is going to increase. Unfortunately, the encrypted nature of the traffic may make it hard for customers (or network administrators) to isolate the parts of the end-to-end network paths at which performance problems are occurring. By collecting performance measures at the devices where the encryption or decryption of customer generated traffic occurs, it may be possible to obtain a more accurate view of the VPN traffic conditions than if additional packets were added for monitoring alone.

Illustrative Computer System

Figure 10:
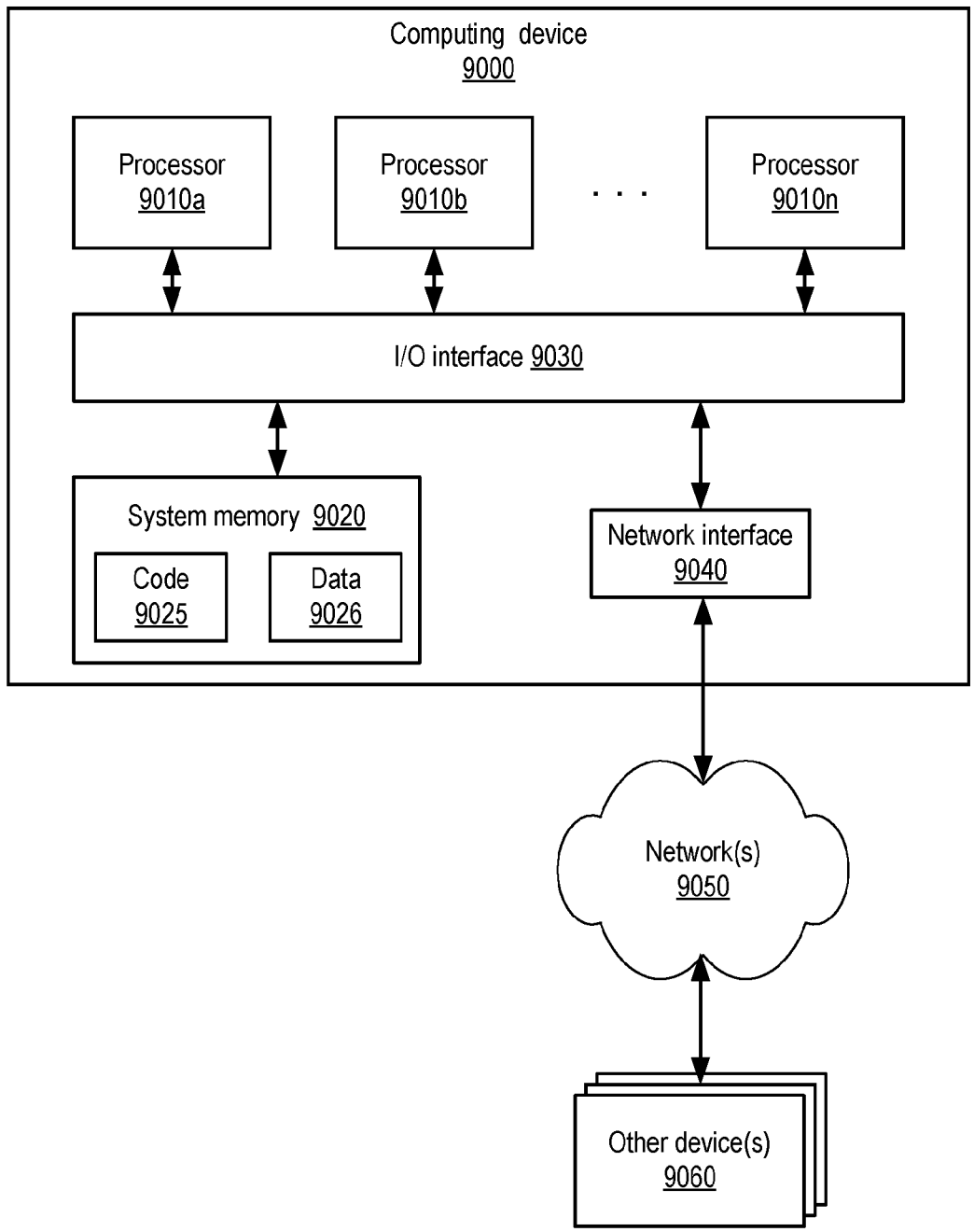
FIG. 10 is a block diagram illustrating an example computing device that may be used in at least some embodiments.

In at least some embodiments, a server that implements a portion or all of one or more of the technologies described herein, including the techniques to implement the IPPEs, traffic analyzers and other control-plane and data-plane components of a connectivity service, virtualization hosts, and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices used to store physical replicas of data object partitions. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a network intermediary device associated with an isolated virtual network established on behalf of a client of a provider network; and
a traffic analyzer executed at one or more computing devices;
wherein the network intermediary device is configured to:
identify a first inbound packet as a candidate for monitoring, wherein the first inbound packet is transmitted via a first virtual private network (VPN) connection established at the request of the client, wherein the first inbound packet is directed from outside the provider network to a compute instance within the isolated virtual network, and wherein the first inbound packet is (a) encrypted outside the provider network and (b) decrypted at the network intermediary device;
in response to determining, based at least in part on an examination of one or more network protocol headers, that a first outbound packet from the compute instance comprises an acknowledgement corresponding to the first inbound packet, cause one or more metrics associated with a first monitored packet group to be stored at a persistent storage repository, wherein the one or more metrics include a latency metric computed at the network intermediary device, and wherein the first monitored packet group comprises the first inbound packet and the first outbound packet; and
wherein the traffic analyzer is configured to:
in response to receiving, via a programmatic interface, a traffic quality query pertaining to the first virtual private network connection,
obtain, from the persistent storage repository, respective metrics associated with one or more monitored packet groups including the first monitored packet group; and
generate a response to the traffic quality query based at least in part on the respective metrics.

2. The system as recited in claim 1, wherein the network intermediary is configured to:
in response to determining that an acknowledgement with respect to a particular packet of a second monitored packet group has not been received within a selected time interval, cause a packet loss metric to be modified.

3. The system as recited in claim 1, wherein the response comprises a time series of values, including at least one value obtained by applying an aggregation function to a particular metric over a particular time interval.

4. The system as recited in claim 1, wherein the traffic analyzer is configured to:
transmit an indication of one or more packet categories for which monitoring is approved by the client to the network intermediary device; and
wherein, to identify the first inbound packet as a candidate for monitoring, the network intermediary device is configured to determine whether the first inbound packet belongs to the one or more packet categories.

5. The system as recited in claim 1, wherein the network intermediary device comprises a protocol processing engine of a virtual private gateway configured for the isolated virtual network, wherein the protocol processing engine executes at a second compute instance.

6. A method, comprising:
identifying, at a first network processing component of a provider network, a first packet as a candidate for monitoring, wherein the first packet is associated with a first virtual private network (VPN) connection established at the request of a client, wherein the first packet is transmitted along a path between a first endpoint located within the provider network and a second endpoint outside the provider network, wherein the path includes the first network processing component, and wherein the first packet is encrypted prior to its transmission along at least a portion of the path;
in response to determining, at the first network processing component, based at least in part on an examination of one or more network protocol headers, that a second packet comprises an acknowledgement with respect to the first packet, causing one or more metrics associated with a first monitored packet group to be stored at a repository, wherein the first monitored packet group comprises the first packet and the second packet; and
transmitting, by a traffic analyzer of the provider network, an indication of traffic quality associated with the first VPN connection, wherein the indication is based at least in part on respective metrics associated with one or more monitored packet groups including the first monitored packet group.

7. The method as recited in claim 6, wherein the first network processing component comprises a virtual private gateway configured for a first isolated virtual network of the provider network, wherein the first endpoint comprises a first compute instance of the first isolated virtual network.

8. The method as recited in claim 7, wherein the virtual private gateway is implemented at least in part at a second compute instance.

9. The method as recited in claim 8, further comprising:
configuring, by a control-plane component of the provider network prior to said identifying the first packet, a second isolated virtual network comprising the second compute instance.

10. The method as recited in claim 6, further comprising:
providing, by the traffic analyzer to a client, an indication of a set of packet categories which can be monitored for traffic quality analysis, wherein the set of packet categories includes a first category to which the first packet belongs; and
determining, by the first network processing component that the first packet belongs to the first category.

11. The method as recited in claim 10, wherein the first category comprises one or more of: (a) an ICMP echo packet, (b) a TCP connection establishment packet, or (c) a TCP connection teardown packet.

12. The method as recited in claim 6, wherein the indication of traffic quality comprises one or more of: (a) a latency indicator, or (b) a packet loss indicator.

13. The method as recited in claim 6, wherein the indication of traffic quality comprises metrics aggregated based at least in part on one or more of: (a) a direction of traffic flow with respect to the provider network, or (b) a packet transfer sub-path location with respect to a provider network boundary.

14. The method as recited in claim 6, further comprising:
receiving, by the traffic analyzer, a query from a client via a programmatic interface, wherein the query indicates one or more of (a) a time interval with respect to which a traffic quality indication is to be provided or (b) an address range with respect to which a traffic quality indication is to be provided; and selecting, by the traffic analyzer, the one or more monitored packet groups based at least in part on the query.

15. The method as recited in claim 6, further comprising:

identifying, at the first network processing component, a third packet as a candidate for monitoring, wherein the third packet is associated with the first virtual private network (VPN) connection;

in response to determining, at the first network processing component, that an acknowledgement with respect to the third packet has not been received within a selected time interval, cause a packet loss metric to be updated at the repository.

16. A non-transitory computer-accessible storage medium storing program instructions that when executed on one or more processors:

receive a particular network packet directed from a first endpoint of a virtual private virtual network (VPN) connection to a second endpoint of the VPN connection, wherein at least one endpoint of the first and second endpoints comprises a guest virtual machine established at a provider network on behalf of a client;

store metadata indicating that the particular network packet has been identified as a candidate for monitoring;

initiate a transmission at least a portion of contents of the particular network packet on a selected network path to the second endpoint;

examine respective network protocol headers of one or more packets directed from the second endpoint to the first endpoint;

in response to determining that an acknowledgement corresponding to the particular network packet has not been received within a time interval, cause one or more traffic quality metrics associated with the particular network packet to be stored at a storage location accessible to a traffic analyzer of the provider network.

17. The non-transitory computer-accessible storage medium as recited in claim 16, wherein the instructions when executed at the one or more processors:

receive a second network packet directed from the first endpoint to the second endpoint;

store metadata indicating that the second network packet has been identified as a candidate for monitoring;

receive a third network packet directed from the second endpoint to the first endpoint;

in response to determining that the third received network packet comprises an acknowledgement with respect to the second network packet, cause a latency metric to be stored at the storage location.

18. The non-transitory computer-accessible storage medium as recited in claim 16, wherein the instructions when executed at the one or more processors:

decrypt at least a portion of the particular network packet; and utilize the decrypted portion to identify the particular network packet as a candidate for monitoring.

19. The non-transitory computer-accessible storage medium as recited in claim 16, wherein the metadata comprises one or more of: (a) a timestamp, (b) a network protocol identifier, (c) a source address, (d) a destination address, (e) a sequence number, or (f) a packet type flag.

20. The non-transitory computer-accessible storage medium as recited in claim 16, wherein the instructions when executed on the one or more processors:

receive an indication of a first packet category which has been approved for monitoring by the client; and identify the particular network packet as a candidate based at least in part on a determination that the particular network packet belongs to the first packet category.

* * * * *